US011268547B2

(12) United States Patent
Rademacher (10) Patent No.: US 11,268,547 B2
(45) Date of Patent: Mar. 8, 2022

(54) HYDRAULICALLY POWERED ROTARY ACTUATOR

(71) Applicant: Weir Minerals Australia Ltd, Artarmon (AU)

(72) Inventor: Marcelo Rademacher, Artarmon (AU)

(73) Assignee: Weir Minerals Australia Ltd.

( * ) Notice: Subject to any disclaimer, the term of this patent is extended or adjusted under 35 U.S.C. 154(b) by 727 days.

(21) Appl. No.: 15/757,320

(22) PCT Filed: Aug. 15, 2016

(86) PCT No.: PCT/AU2016/050753
§ 371 (c)(1),
(2) Date: Mar. 2, 2018

(87) PCT Pub. No.: WO2017/035572
PCT Pub. Date: Mar. 9, 2017

(65) Prior Publication Data
US 2019/0072116 A1    Mar. 7, 2019

(30) Foreign Application Priority Data

Sep. 4, 2015  (AU) ................................ 2015903630
Sep. 7, 2015  (AU) ................................ 2015903640

(Continued)

(51) Int. Cl.
*F15B 15/06*  (2006.01)
*F04D 7/04*  (2006.01)
(Continued)

(52) U.S. Cl.
CPC ............ *F15B 15/061* (2013.01); *F04D 7/045* (2013.01); *F04D 15/0027* (2013.01);
(Continued)

(58) Field of Classification Search
CPC ........ F15B 15/061; F16D 35/18; F16H 25/14; F04D 15/0027; F04D 15/003; F04D 29/622

See application file for complete search history.

(56) References Cited

U.S. PATENT DOCUMENTS 3,603,212 A   9/1971   Geyer
4,265,132 A   5/1981   Robertson
(Continued)

FOREIGN PATENT DOCUMENTS

DE   2346251 A1   10/1977
GB   2 176 431 A   12/1986

OTHER PUBLICATIONS

DE 2346251, Specification in English (Year: 1975).*
European Patent Application No. 16840401.0, Extended European Search Report dated Apr. 17, 2019, 7 pgs.

*Primary Examiner* — Richard A Edgar
*Assistant Examiner* — John S Hunter, Jr.
(74) *Attorney, Agent, or Firm* — Morriss O'Bryant; Compagni Cannon, PLLC (57) ABSTRACT

A hydraulically powered rotary actuator is described including: a hydraulic linear actuator which is moveable in both directions between a retracted position and an extended position; a clutch device which is operable between an engaged condition and a disengaged condition; and a rotary output member; wherein the linear actuator is coupled to the rotary output member by way of the clutch.

8 Claims, 13 Drawing Sheets

(30) Foreign Application Priority Data

Sep. 16, 2015 (AU) .................. 2015903768
Apr. 11, 2016 (AU) .................. 2016901332

(51) Int. Cl.
*F04D 15/00* (2006.01)
*F04D 29/62* (2006.01)
*F16H 25/14* (2006.01)
*F16H 35/18* (2006.01)

(52) U.S. Cl.
CPC ........... *F04D 29/622* (2013.01); *F16H 25/14* (2013.01); *F16H 35/18* (2013.01); *F04D 15/0033* (2013.01)

(56) References Cited

U.S. PATENT DOCUMENTS

| | | | |
|---|---|---|---|
| 5,971,704 A | 10/1999 | Blattmann | |
| 6,076,799 A | 6/2000 | Baumann | |
| 7,871,241 B2* | 1/2011 | Bourgeois | F04D 27/00 415/128 |
| 2009/0180866 A1 | 7/2009 | Bourgeois et al. | |
| 2014/0328667 A1 | 11/2014 | Sommer et al. | |

* cited by examiner

HYDRAULICALLY POWERED ROTARY ACTUATOR

CROSS-REFERENCE TO RELATED APPLICATIONS

This application is filed under 35 U.S.C. 371, which claims priority to and the benefit of PCT/AU2016/050753, having a filing date of Aug. 15, 2016, which claims priority to and benefit of Australian Patent Application No. 2015903630, having a filing date of Sep. 4, 2015, Australian Patent Application No. 2015903640, having a filing date of Sep. 7, 2015, Australian Patent Application No. 2015903768, having a filing date of Sep. 16, 2015, and Australian Patent Application No. 2016901332, having a filing date of Apr. 11, 2016, all of which are hereby incorporated herein by reference in their entirety for all purposes.

TECHNICAL FIELD

This specification relates to hydraulically powered actuators which are suited to making automated adjustments of leakage restricting devices in centrifugal pumps.

BACKGROUND

Adjustment mechanisms for sealing arrangements and side liners in centrifugal pumps in the past have mainly been directed to providing a manual means of adjustment (manual wrenches, hydraulic wrenches, impact wrenches, etc.).

The use of high reduction ratio gearboxes for automated adjustment has been attempted, but it was found that the large size requirement needed for such gearboxes, in order to provide adequate torque in large centrifugal pumps, made them unwieldy and impractical for this purpose.

SUMMARY OF THE DISCLOSURE

In a first aspect, there is provided a hydraulically powered rotary actuator including: a hydraulic linear actuator which is moveable in both directions between a retracted position and an extended position; a clutch device which is operable between an engaged condition and a disengaged condition; and a rotary output member; wherein the linear actuator is coupled to the rotary output member by way of the clutch.

In certain embodiments, the clutch is hydraulically operated.

In certain embodiments, the clutch device includes an arm and the linear actuator is pivotally attached to the arm.

In certain embodiments, the clutch device includes at least two clutch discs which frictionally engage with one another.

In certain embodiments, the at least two clutch discs engage at regions about their peripheries which are tapered.

In certain embodiments, the clutch device operates by mechanical interengagement of clutch parts.

In certain embodiments, the clutch parts interengage by way of a series of projections.

In a second aspect there is provided a method of operating an actuator in accordance with the first aspect, the method including the sequential steps of: operating the clutch device to the engaged condition; and moving the linear actuator.

In certain embodiments, a number of like actuators are operated simultaneously.

In a third aspect, there is provided a centrifugal pump including at least one actuator in accordance with the first aspect.

In certain embodiments, the centrifugal pump includes two or more actuators which are in accordance with the first aspect.

In certain embodiments, like hydraulic inputs of different actuators are plumbed to a common hydraulic control valve.

In certain embodiments, the at least one actuator is mounted to a suction cover of the pump, and the actuator does not extend outwardly beyond a periphery of the suction cover.

In a fourth aspect, there is provided a system for adjusting the gap distance between a side liner and an impeller of a centrifugal pump, the system comprising at least one rotary actuator in accordance with the first aspect.

In a fifth aspect, there is provided a method of retrofitting an actuator to a centrifugal pump, wherein the actuator is in accordance with the first aspect, so as to allow a method of operation in accordance with the second aspect.

In a sixth aspect, there is provided a control system for controlling the at least one actuator of the centrifugal pump of the third aspect, the control system including: at least one hydraulic control valve; and at least one sensor; wherein the control system is arranged to operate the at least one hydraulic control valve based on the output of the at least one sensor to adjust the gap distance between a side liner and the impeller of the pump.

Other aspects, features, and advantages will become apparent from the following detailed description when taken in conjunction with the accompanying drawings, which are a part of this disclosure and which illustrate, by way of example, principles of inventions disclosed.

BRIEF DESCRIPTION OF THE DRAWINGS

Embodiments will now be described, by way of example only, with reference to the accompanying drawings, in which.

DETAILED DESCRIPTION

One approach known in the prior art for providing automated adjustment of leakage restricting devices in centrifugal pumps is by way of electrically powered high reduction gearboxes and stepper motors, as described in published international patent application WO2009/091575 to Weir Slurry Group, Inc. The entire contents of that document are incorporated herein by reference.

Figure 1:
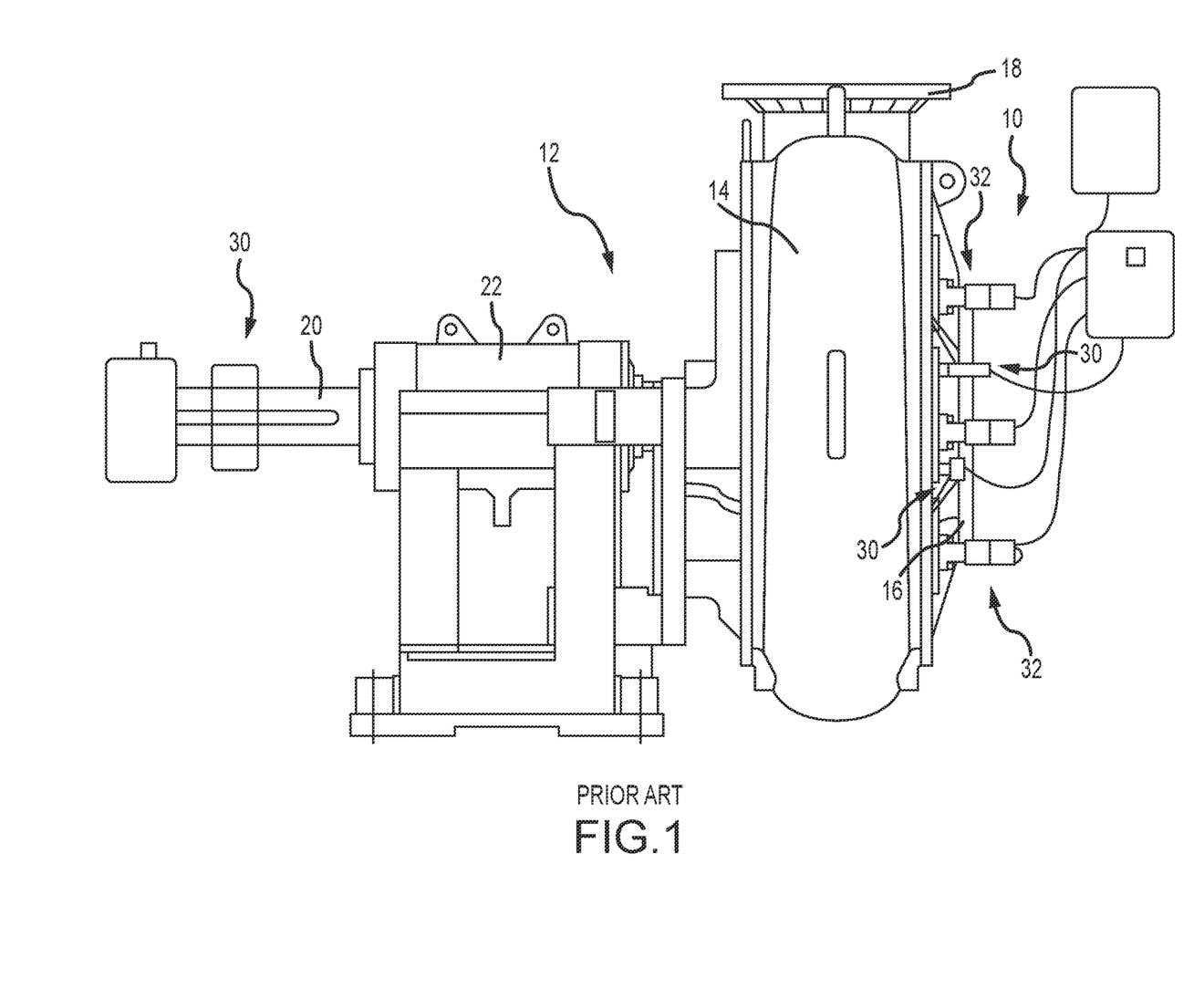
FIG. 1 is an illustration of a prior art approach to making automated adjustments of a side liner of a centrifugal pump.

Referring to FIG. 1, a figure from WO2009/091575 is shown for ease of reference. FIG. 1 illustrates an automatic adjustment system 10 installed in a centrifugal pump 12. The pump 12 generally comprises a pump casing 14 having a fluid inlet 16 and a fluid outlet 18 for the respective ingress and discharge of fluid and/or slurry materials via the pump 12. The pump 12 further includes a drive mechanism 20 for driving the rotating elements of the pump, and the drive mechanism 20 is positioned through a bearing assembly 22, to which the pump casing 14 is secured in known manner.

The automatic adjustment system 10 is generally comprised of at least one sensor or detection mechanism 30 (of which a plurality of various sensor or detection mechanisms are shown for illustrative purposes), and a plurality of adjustment devices 32 which are positioned to encircle the fluid inlet 16 region of the pump 12. In this prior art example, each of the adjustment devices 32 comprises an electrically powered stepper motor coupled to a high reduction gearbox which is in turn coupled to the head of an adjustment bolt of the leakage control mechanism of the pump 12. In this prior art example, the adjustment bolts that are driven by the reduction gearboxes are known as "pusher bolts", which adjust the clearance distance between the side liner (also known as a 'throatbush') and the impeller of the pump 12. As is well known in the art, a regular adjustment of clearance between throatbush and impeller is desirable to maintain optimum slurry pump operation, and can be conducted whilst the slurry pump is in operational mode.

Embodiments described below principally differ from the arrangements described in WO2009/091575 because of the provision of a new type of actuator for driving the adjustment bolts which control the clearance between the side liner and the impeller.

Figure 2:
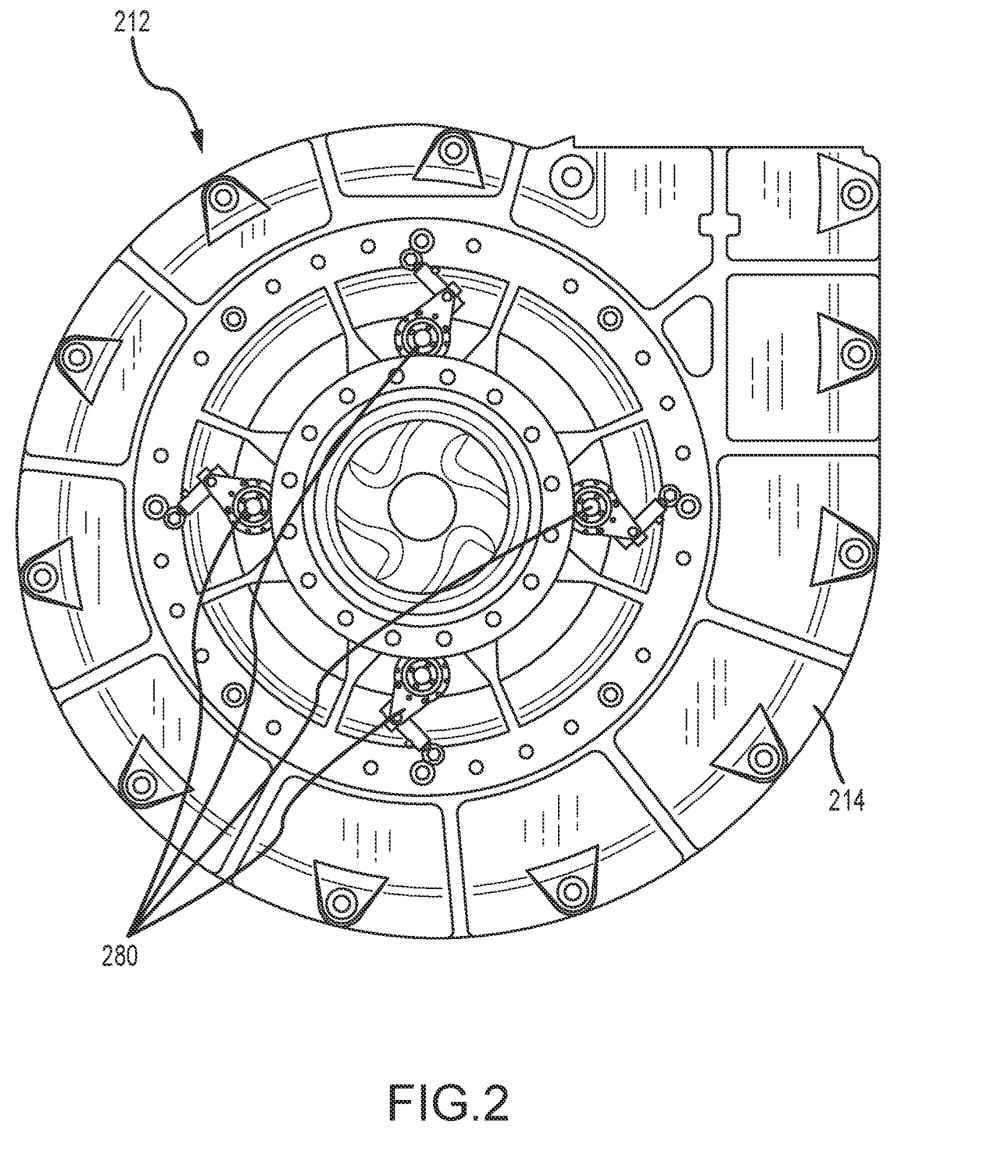
FIG. 2 is an elevation view of a centrifugal pump fitted with four hydraulic rotary actuators in accordance with the present disclosure.

Referring to FIG. 2, a slurry pump 212 is shown including an outer casing 214 to which are attached a series of four hydraulically powered actuators 280.

Figure 3:
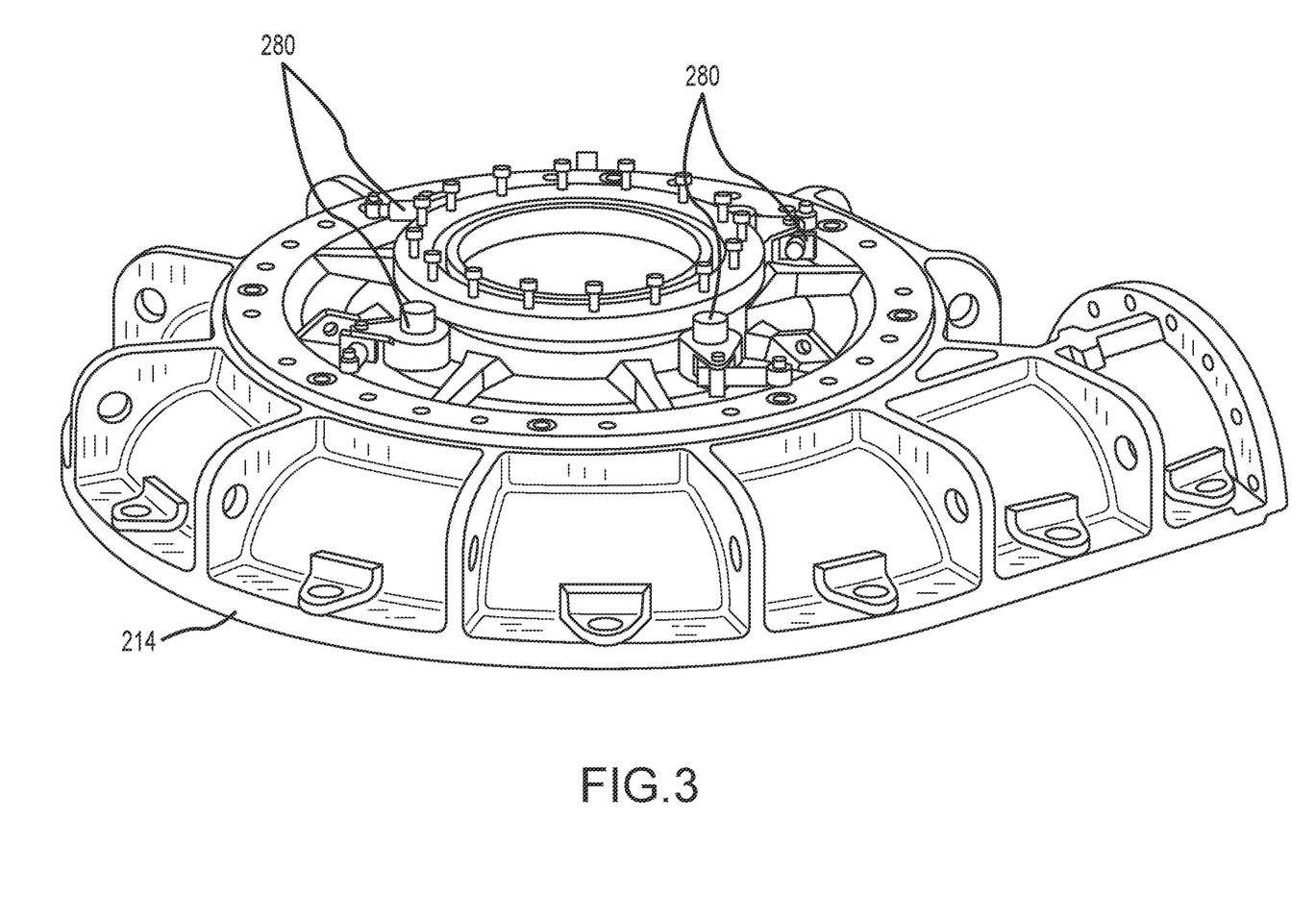
FIG. 3 is a perspective view of the outer casing of the pump of FIG. 2.

Referring to FIG. 3, the front half outer casing 214 is shown detached from the pump.

Figure 4:
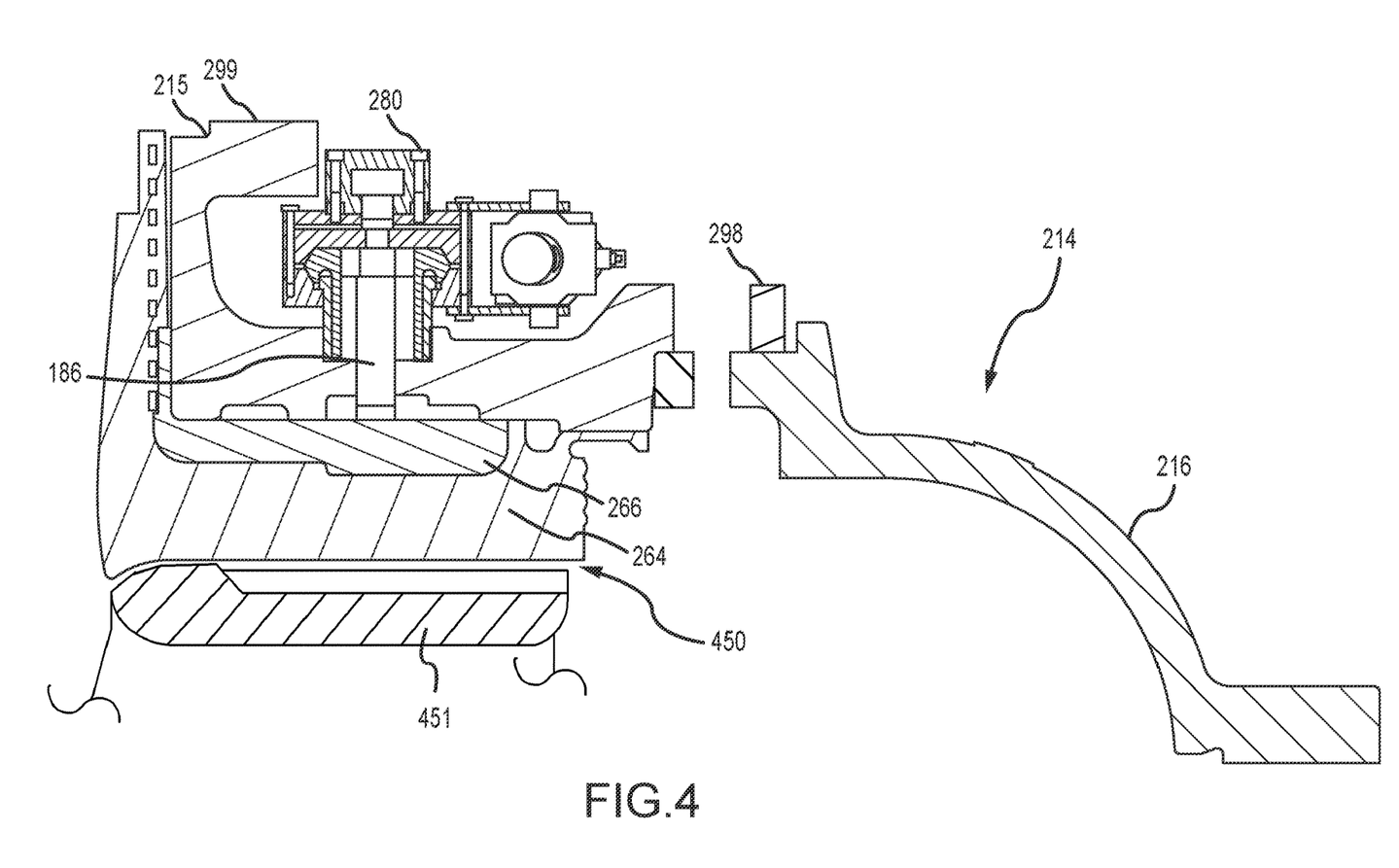
FIG. 4 is a cross sectional view of the pump casing of FIG. 3.

Referring to FIG. 4, the outer casing 214 is comprised of a cover plate 216 and a suction cover 215. The side liner (or throatbush) 264 of the pump is seated at a reinforcing plate 266 in the form of an annular disc. Each actuator 280 controls rotation of a threaded pusher bolt 186 which sits within a threaded hole in the suction cover 215. Rotation of the pusher bolts 186 effects a lateral adjustment of the position of the side liner 264 with respect to the pump impeller (not shown). Thus, as previously discussed hereinabove, but with the benefit of reference numeral 450 referring to FIG. 4, there is provided a system for adjusting the gap distance 450 between a side liner 264 and an impeller of a centrifugal pump, the system comprising at least one rotary actuator in accordance with the first aspect. There is provided a control system for controlling the at least one actuator of the centrifugal pump, the control system including: at least one hydraulic control valve; and at least one sensor; wherein the control system is arranged to operate the at least one hydraulic control valve based on the output of the at least one sensor to adjust the gap distance 450 between a side liner 264 and the impeller 451 of the pump.

The side liner 264 is a wear part which is required to be replaced from time to time. To replace the side liner 264 the suction cover 215 is removed from the cover plate 216. The actuators 280 have a very compact size. It is of note that the outer surface of the flange 299 of the pump casing 214 stands proud of the actuator 280. If the suction cover 215 of the pump 212 is ever removed for purposes of maintenance or repair, then it can be laid on its side to rest on the flange 299 and the actuators 280 are protected from physical damage by the flange 299.

In addition, it is also of note that the actuators 280 do not extend beyond the outer periphery of the suction cover 215, as indicated by reference numeral 298. If the suction cover 215 of the pump 212 is ever removed for purposes of maintenance or repair, then it can rest upright on its peripheral edge 298, and the actuators 280 are protected from physical damage.

With the actuators protected from damage it means that the actuators 280 do not need to be removed from the suction cover 215 during maintenance operations, which reduces pump downtime.

Figure 5:
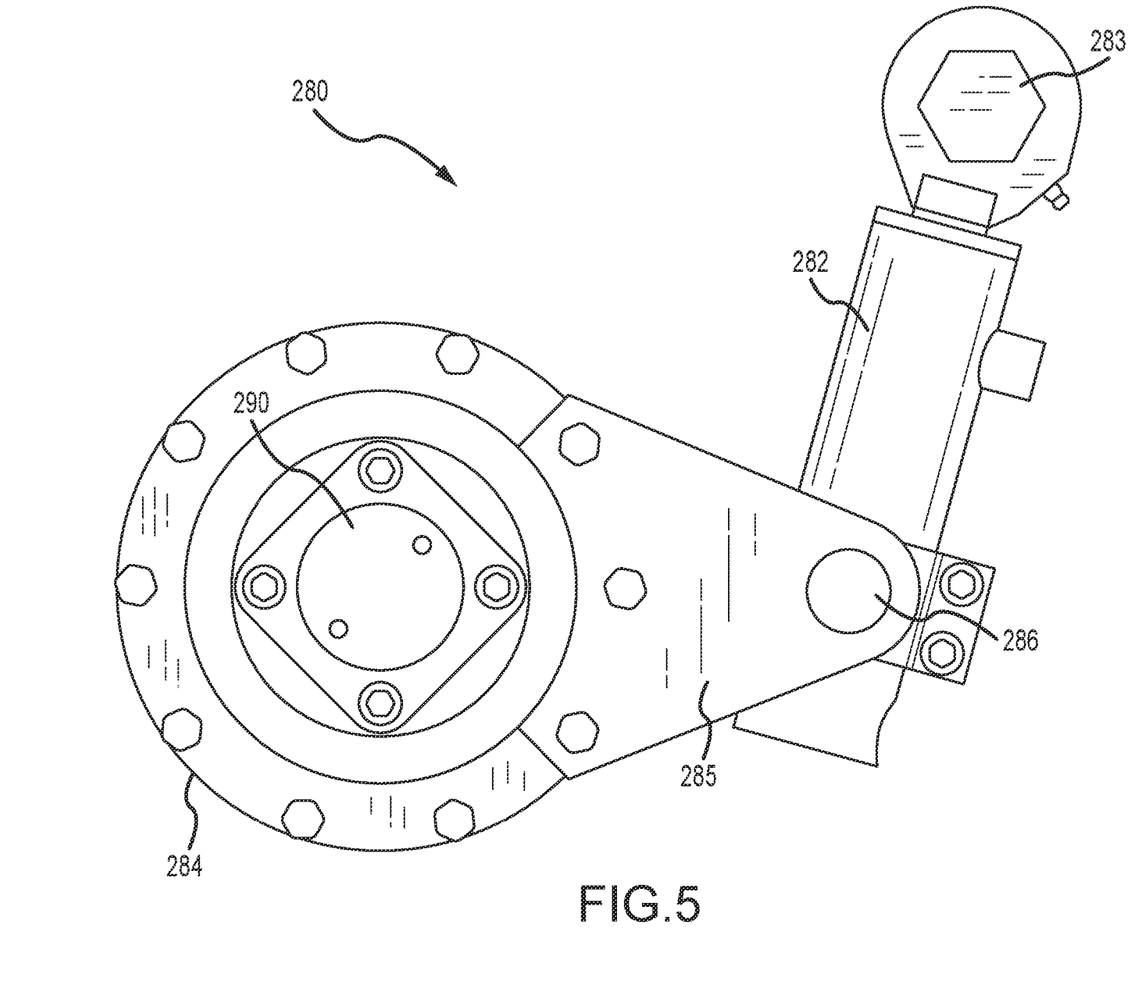
FIG. 5 is an elevation view of one of the rotary actuators of FIG. 2.
Figure 6:
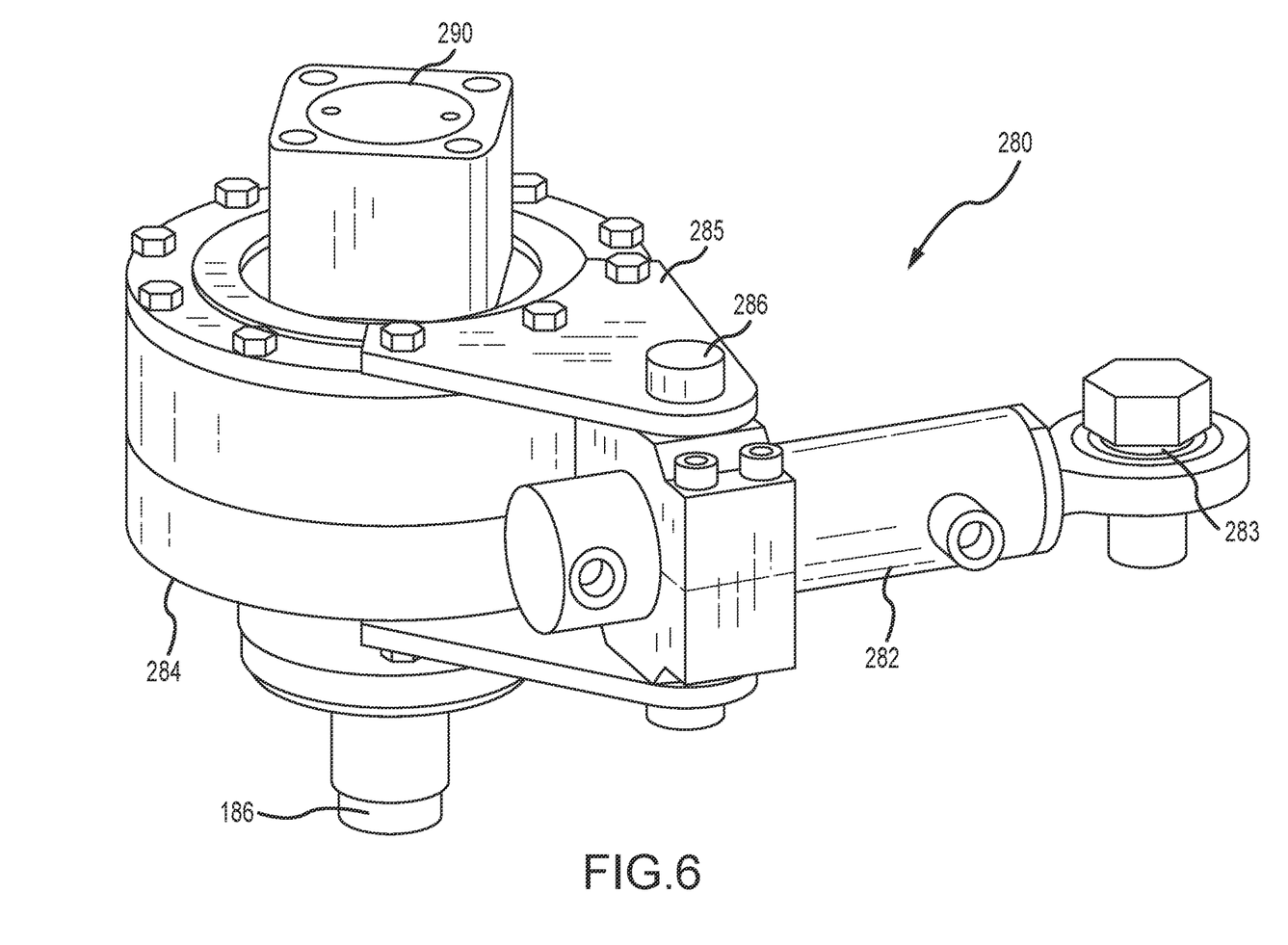
FIG. 6 is a perspective view of the rotary actuator of FIG. 5.

Referring to FIGS. 5 and 6, the actuator 280 includes a hydraulic linear actuator in the form of dual acting hydraulic ram 282 which is operable by application of pressurised hydraulic fluid to either one of its two fluid ports, the ram 282 in use arranged to move between a retracted position as shown in FIG. 5 and an extended position. In use, the free end 283 of the ram 282 is affixed to the pump casing 214 by way of a bolt. The other end of ram 282 is pivotally attached to an arm 285 of a clutch assembly 284 by way of pivot point 286. The clutch assembly 284 includes a hydraulically operated cylinder 290 which controls engagement of the clutch as will be described. In FIG. 6, a pusher bolt 186 is illustrated for ease of understanding, although such pusher bolts 186 do not themselves form part of the actuator.

Figure 7:
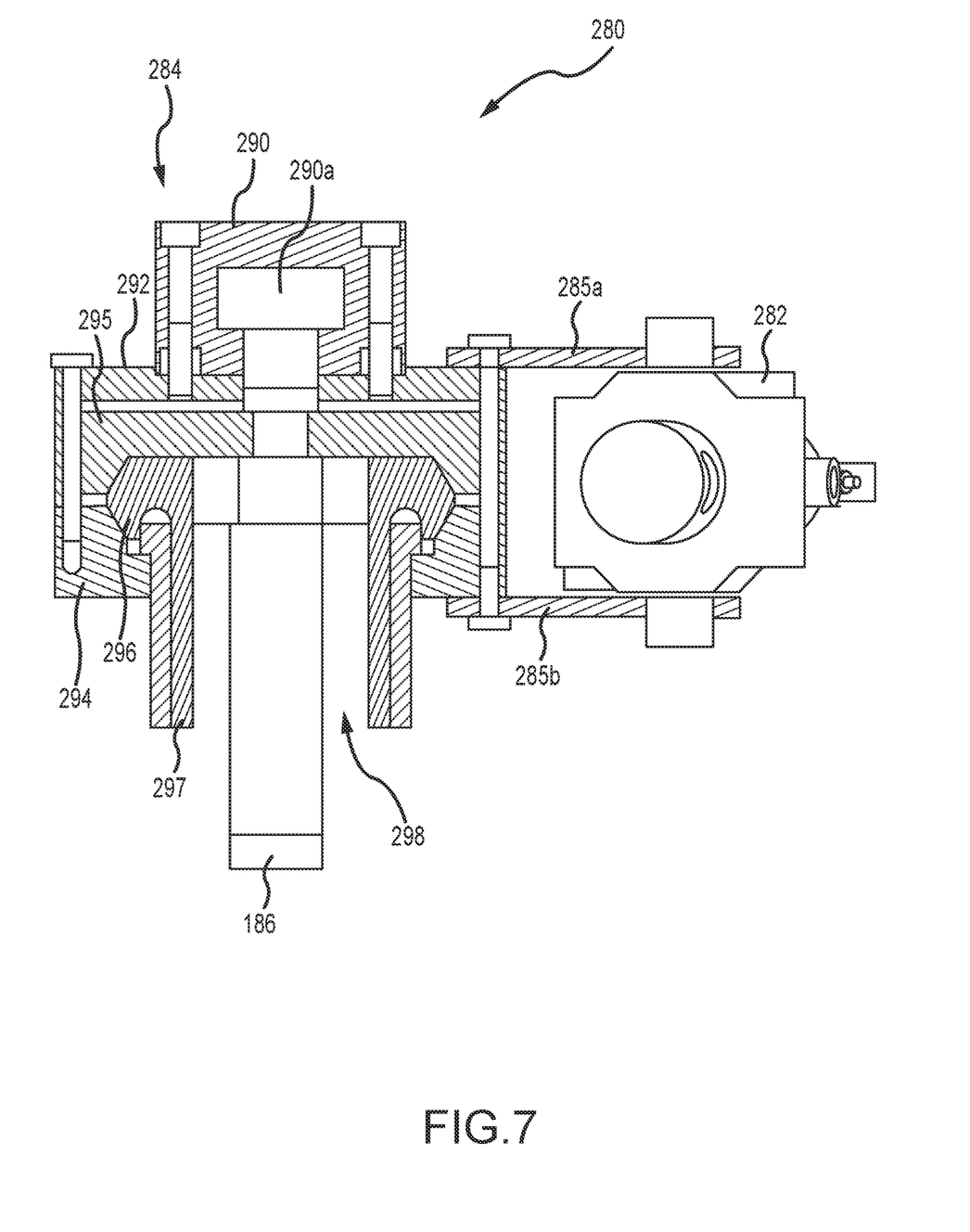
FIG. 7 is a cross sectional view of the rotary actuator of FIG. 5
Figure 8:
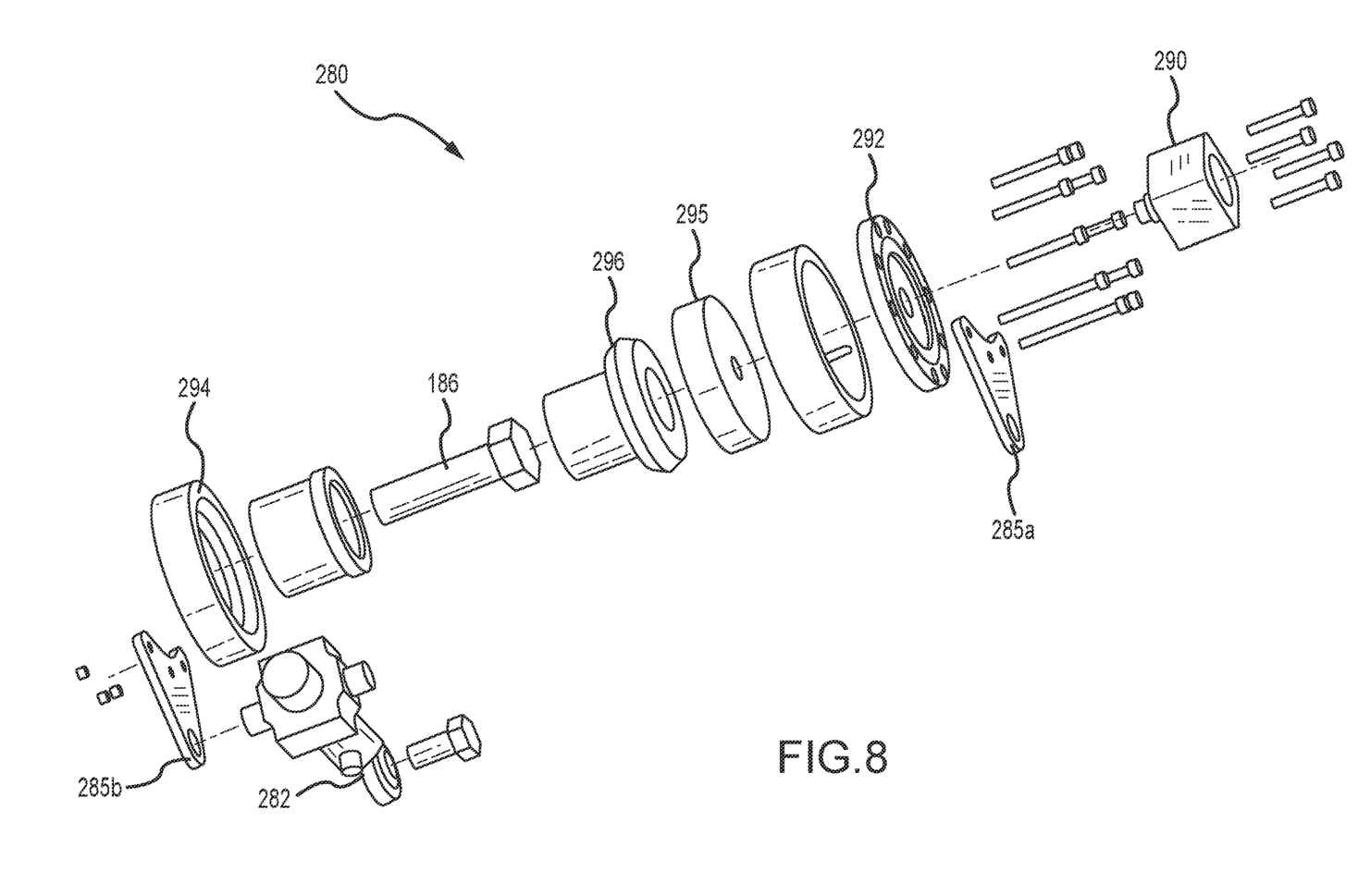
FIG. 8 is an exploded view of the rotary actuator of FIG. 5.

Referring to FIGS. 7 and 8, the arm 285 is comprised of upper and lower arm members in the form of webs 285a and 285b which pivotally connect to the hydraulic ram 282. The clutch assembly 284 includes an upper cover 292 to which is mounted the hydraulic cylinder 290. The upper cover 292 is bolted to a lower clutch disc 294. An upper clutch disc 295 sits in the space inside the upper cover 292 and the lower clutch disc 294. The actuator 280 further includes a rotary output member in the form of an output dog 297. A central clutch disc 296 is formed by the upper region of the rotary output dog 297. The output dog 297 further includes an elongate hexagonal recess 298 which accommodates the head of a pusher bolt 186. The output dog 297 drives the pusher bolt 186 either clockwise or anticlockwise which results in lateral movement of the head of the bolt 186 with respect to the pump casing 214. This lateral movement is accommodated by the elongate recess 298.

Activation of the hydraulic cylinder 290 controls operation of the clutch mechanism. When pressurised fluid is applied to the cylinder 290 the piston 290a pushes against the upper clutch disc 295; at the same time the hydraulic cylinder 290 causes a pulling of the lower clutch disc 294 because it is mounted to the upper cover 292 which is in turn mounted to the lower clutch disc 294. This movement has the effect of clamping the central clutch disc 296 between the upper 295 and lower 294 clutch discs, thus generating a mechanical join in the region around the periphery of the central disc where the plates meet due to the friction between the contact surfaces of the three clutch discs 294, 295, 296. The frictional engagement surfaces of the discs 294, 295, 296 are tapered to increase the frictional force and thus the torque capacity of the device. The dual acting cylinder 282 provides the twisting force to generate the required torque to turn the clutch device which is connected to the pusher bolt 186.

A supply of pressurised hydraulic fluid can be provided to the hydraulic cylinder(s) 290 and ram 282 by a nearby hydraulic pump and electronic valve control arrangement which may be mounted to the pump or otherwise mounted nearby to the pump. Such pump and valve arrangements are known in the art of hydraulic machinery.

The actuator 280 operates either in a clockwise or an anticlockwise direction by way of specific sequences of activation of both the hydraulic ram 282 and the cylinder 290 to make incremental rotational adjustments to the pusher bolt 186 as follows:

Clockwise Rotation—To Turn Bolt In
1 Verify that cylinder 290 is deactivated—clutch disengaged
2 Move ram 282 to retracted position
3 Activate cylinder 290—clutch engaged
4 Activate ram 282 to move to extended position
Anticlockwise Rotation—To Turn Bolt Out
1 Verify that cylinder 290 is deactivated—clutch disengaged
2 Move ram 282 to extended position
3 Activate cylinder 290—clutch engaged
4 Activate ram 282 to move to retracted position In each incremental adjustment the ram 282 rotates the clutch assembly 284 and pusher bolt 186 by an amount which is dictated by the length of the stroke of the ram 282 and the distance from the centre of pivot point 286 to the axis of rotation of the output dog 297.

In the case of the arrangement of four actuators 280 shown in FIG. 2, the hydraulic control system can be conveniently configured so that like fluid ports of each actuator 280 are plumbed to a common pressure supply line. In this way a single control valve can be used to simultaneously control an operation of all four actuators. For example, the cylinders 290 may all be activated simultaneously, and with equal pressure. Similarly, for the rams 282, these can be activated to extend simultaneously or retract simultaneously by operation of another control valve in the form of a 4/3 crossover valve that changes the direction of the fluid. In this way, all of the operations of all of the rotary actuators fitted to a pump can be controlled with only two control valves. This provides an elegant way of ensuring that all pusher bolts 182 of a pump are adjusted by equal amounts and at the same time.

The adjustments to the pusher bolts 186 are performed step by step as the actuator turns the pusher bolt a fraction of a turn at a time, which adjusts the leakage restricting device a fraction of millimetre, and allowing the control system to know with precision the actual position of the leakage restricting device by the number of adjustment steps carried out.

Some pumps may require more than four hydraulic device according to the amount of pusher bolts supporting the leakage restricting device. In high pressure pumps, as many as 14 pusher bolts may be required to support the leakage restricting device, therefore underlining the importance of the actuator 280 to be compact.

Figure 9:
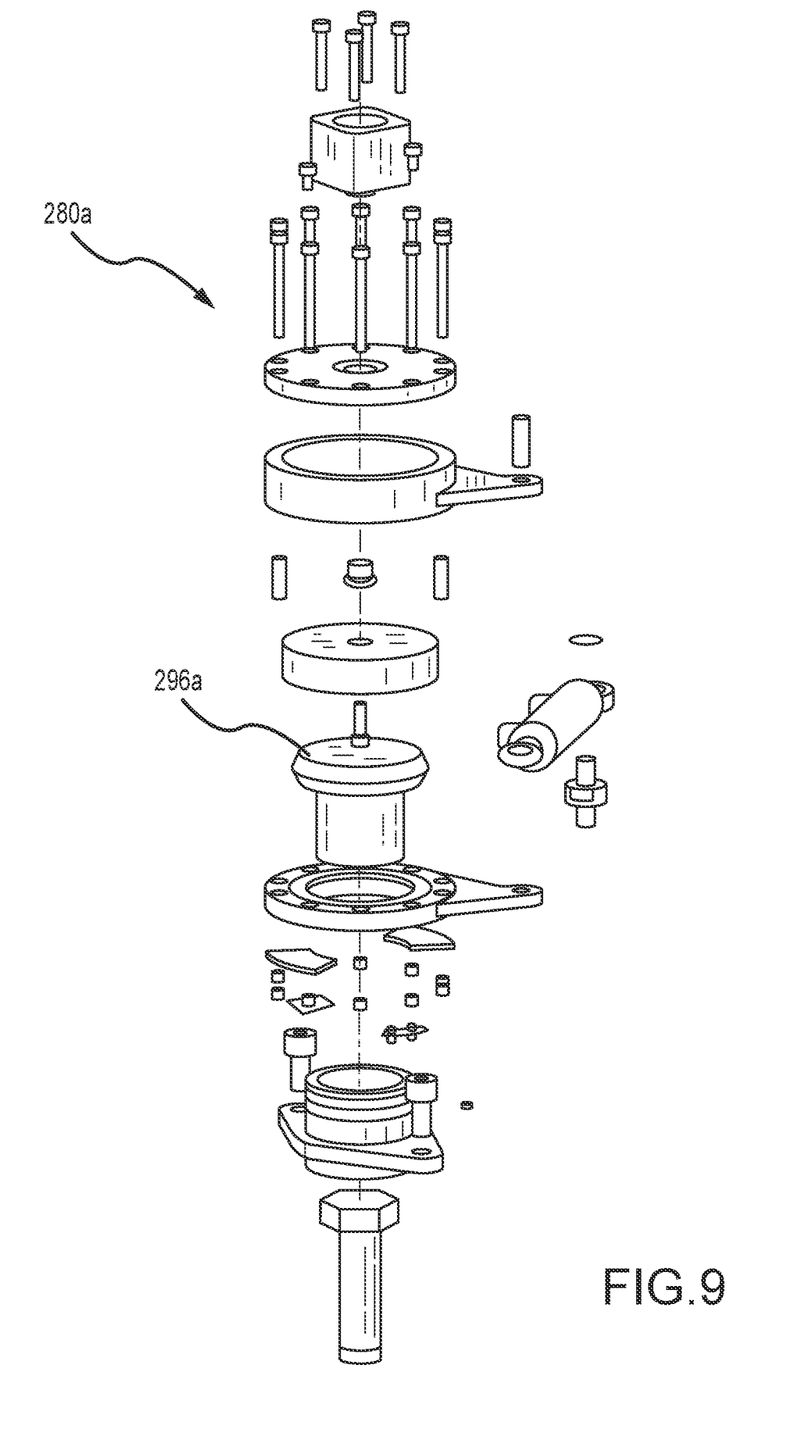
FIG. 9 is an exploded view of another embodiment of a rotary actuator.

Referring to FIG. 9, an alternative embodiment of actuator 280a is shown in exploded view. This embodiment differs from the previously described embodiment principally in the provision of slots 296a about the periphery of the central clutch disc. The slots 296a on the friction face increase grip and remove contaminants (grease, rust).

In some embodiments the friction faces can be coated to increase friction.

In the embodiments described above, the ram 282 and the cylinder 290 are commercially available components. The remaining parts of the actuator can be fabricated from mild steel.

A hydraulic clutch device of type 280a was assembled, fitting an M48 bolt to effect adjustment. A high tonnage hydraulic cylinder was used to apply compression on said bolt to simulate the pushing force exerted by the leakage restricting device in a centrifugal pump. When powered by the hydraulic system, the clutch was able to deliver approximately 6000 Nm of torque before any slippage of the clutch was detected. This torque is about twice the maximum torque expected for the pump size the device was designed for. The clutch was observed to keep turning the pusher bolt with almost no backlash.

Figure 10:
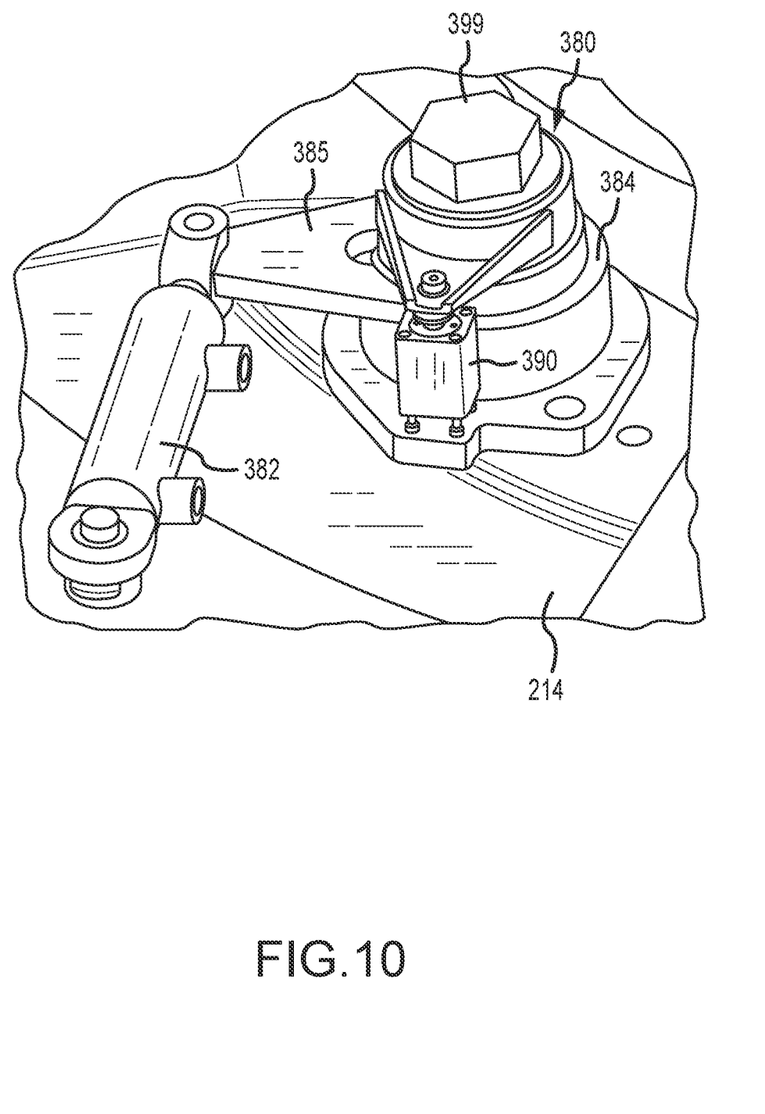
FIG. 10 is a perspective view of an alternative embodiment of a rotary actuator attached to a pump.

Referring to FIG. 10, another embodiment of an actuator 380 is shown in association with pump outer casing 214. This embodiment of actuator 380 can be used in place of actuator 280. Whereas actuator 280 used a frictionally engaging clutch mechanism, actuator 380 uses a dog clutch type arrangement with mechanical interengagement between clutch parts.

Figure 11:
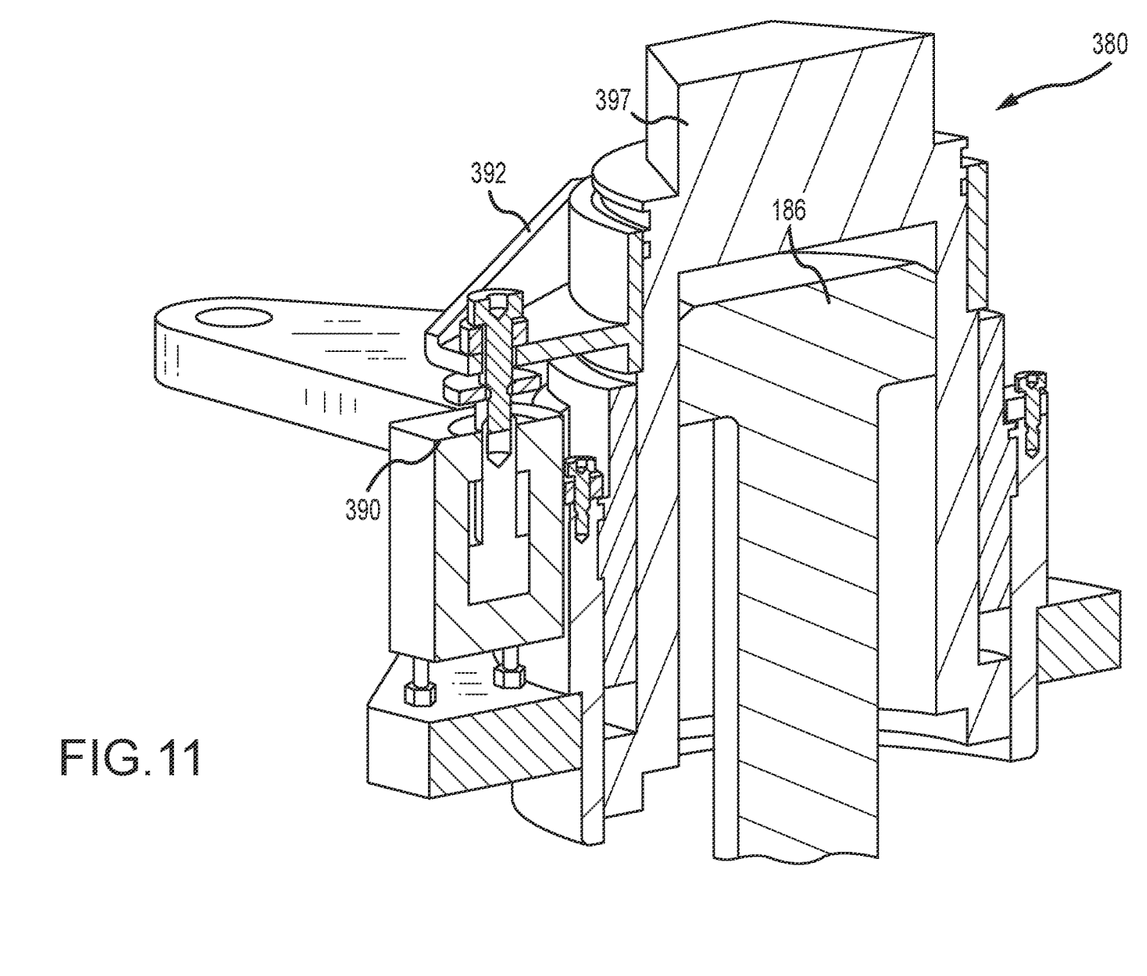
FIG. 11 is a cross sectional view of the rotary actuator of FIG. 10.

Referring to FIG. 11, actuator 380 includes an output dog 397 which engages with the head of a pusher bolt 186 in the same manner as actuator 280. A hydraulic actuator 390 is coupled to output dog 392 by way of collar 392. Operation of actuator 390 controls engagement and disengagement of the clutch mechanism of actuator 390.

Figure 12:
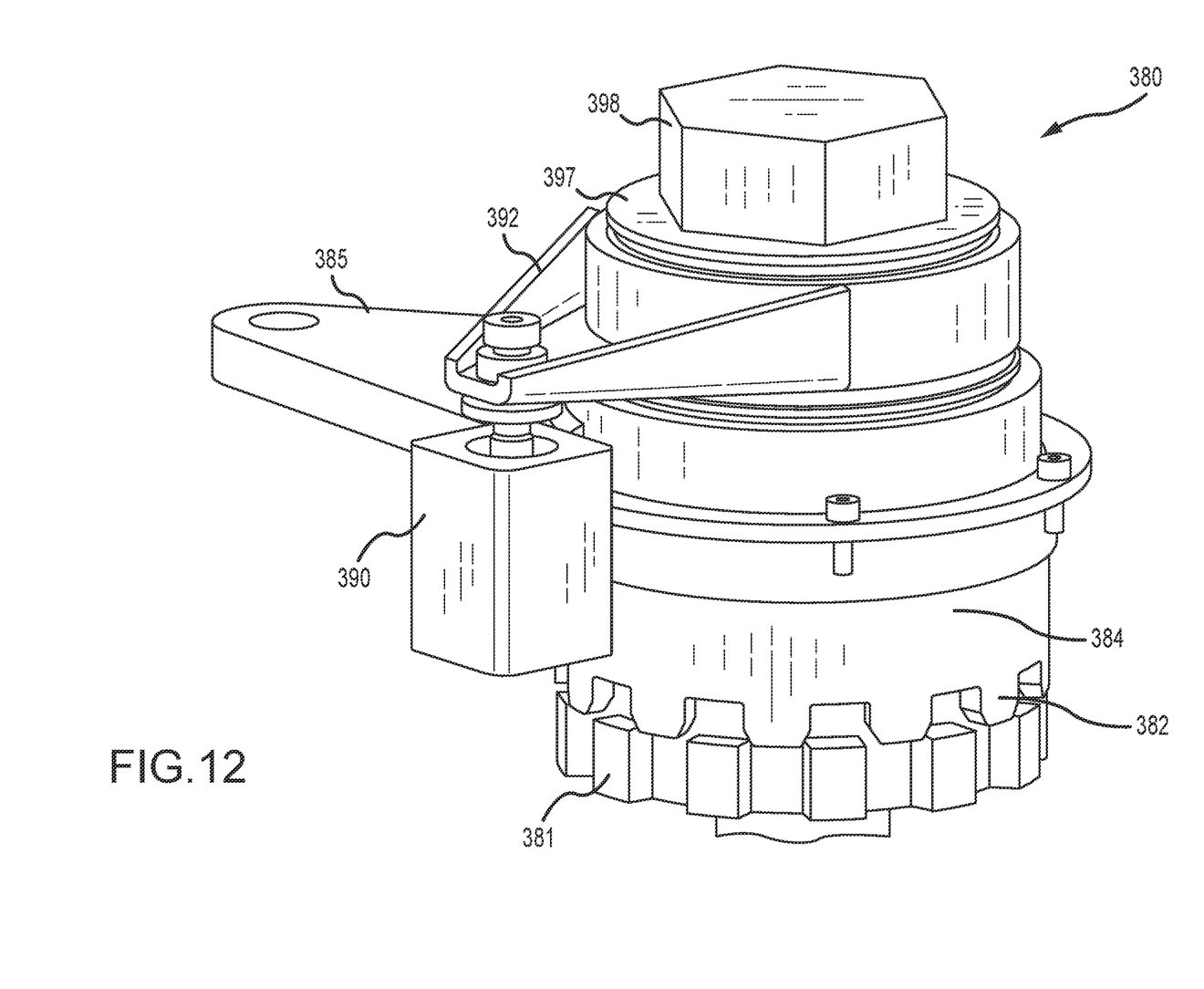
FIG. 12 shows the rotary actuator of FIG. 10 in the disengaged condition.

Referring to FIG. 12, output dog 397 includes a series out outwardly directed projections 381. Arm 385 is connected to a sleeve 384 which surrounds the output dog 397 and includes a series of castellated projections 382 which are selectively engageable with projections 381 depending upon the state of hydraulic cylinder 390. The projections 381, 382 form a dog clutch type mechanism. The projections 382 are chamfered to facilitate alignment of the dog clutch. In FIG. 12 the cylinder 390 is in the retracted position and the clutch mechanism is disengaged.

Figure 13:
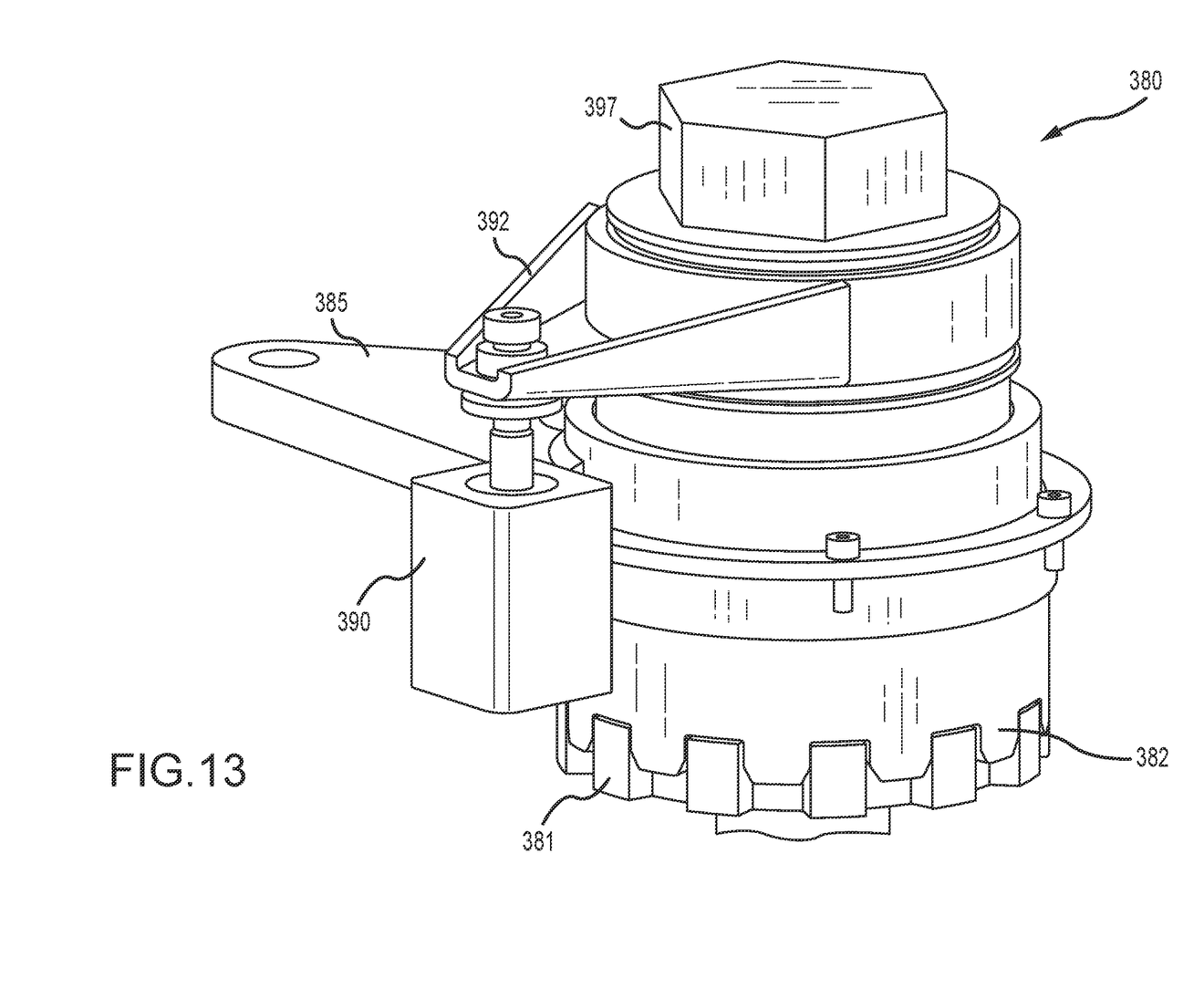
FIG. 13 shows the rotary actuator of FIG. 10 in the engaged condition.

Referring to FIG. 13, the cylinder 390 has been activated to move to the extended condition. This in turn has caused upwards movement of the collar 392 which has moved together with output dog 397 to cause interengagement of projections 381 and 382. The clutch mechanism of the actuator 380 is now engaged.

Referring again to FIG. 10, linear actuating ram 382 is pivotally mounted to arm 385 to impart rotational movement to sleeve 384. By performing the same sequence of operations as described for actuator 280 by activating and deactivating ram 382 and cylinder 390 the pusher bolt 186 held captive in actuator 380 can be progressively incrementally rotated either clockwise or anticlockwise to control the leakage restricting device of the pump. Unlike actuator 280, the clutch device of actuator 380 does not rely on friction between clutch plates. Therefore, the hydraulic cylinder 390 need not exert as much force as the cylinder 290 of actuator 280 and so a cylinder of reduced capacity and size can be used. In other embodiments the hydraulic cylinder may be replaced by other types of actuators such as an electric or pneumatic actuator.

The output dog 397 of actuator 380 has a hexagonal formation 399 on its outer end. This allows the output dog to be manually adjusted by using a wrench or similar tool to directly drive the output dog 397 and thus rotate the captive pusher bolt 186. Of course, the clutch mechanism of actuator 380 would need to be put in the disengaged condition before manual rotation of output dog by way of hexagonal formation 399 could be carried out. Otherwise the rotation of the output dog 397 would be hampered by the linear ram 382.

It can be seen that embodiments of the actuators have at least one of the following advantages:

High torque capability (many times higher than high reduction ratio gear boxes of the same size)

Compact design

Pusher bolts can be turned any number of turns in two directions of adjustment (clockwise and anticlockwise)

Simple control (adjustment is step by step and at a fixed fraction of millimetre at a time)

High synchronisation when a plurality of hydraulic actuators are used on a single pump (several devices can be connected in parallel allowing the adjustment of all pusher bolts at the same time and by the exactly same amount per adjustment step)

The embodiment shown in FIGS. 10 to 13 has the following particular advantages:

Smaller and lighter, delivering higher output torque as the torque capability is limited by the capacity of the hydraulic ram and not by the capacity of the clutch.

100% synchronisation between multiple devices as circular pitch is fixed and not dependent on manufacturing tolerances.

Actuator will not rotate if its torque capacity is exceeded, so overload condition is easy to detect, while a friction clutch may slip without warning.

In case of system failure, the leakage restricting device can be manually adjusted without removing the clutch from the outer casing.

Clutch can remain engaged between adjustment campaigns to avoid loosening of pusher bolts due to vibration.

Dog clutch torque capacity is not affected by oil, grease, etc.

Hydraulic system and mechanical components are less stressed since working pressure only depends on adjustment torque requirement. Friction clutch needs to be operated at a high pressure to ensure good engagement.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A centrifugal pump comprising a first hydraulically powered rotary actuator for incrementally adjusting a gap distance between a side liner and an impeller of the centrifugal pump, the first hydraulically powered rotary actuator comprising:
a first hydraulic linear actuator which is moveable in both directions between a retracted position and an extended position;
a first clutch device which is operable between an engaged condition and a disengaged condition; and
a first rotary output member,
wherein the first hydraulic linear actuator is coupled to the first rotary output member by way of the first clutch device, and
wherein the first hydraulically powered rotary actuator is controllable to effect individual step-wise incremental linear adjustments of the side liner of the centrifugal pump relative to the impeller of the centrifugal pump to maintain a gap distance between the side liner and the impeller, the linear adjustment of the side liner being effected by rotating the rotary output member;
wherein each incremental adjustment is effected by the linear actuator moving from either its retracted position to its extended position, or from its extended position to its retracted position.

2. The centrifugal pump according to claim 1, wherein the first clutch device comprises a hydraulically operated cylinder and a piston, wherein the piston at least one of pushes and pulls clutch discs such that the first clutch device is hydraulically operated.

3. The centrifugal pump according to claim 1, wherein the first clutch device comprises an arm, and wherein the first hydraulic linear actuator is pivotally attached to the arm.

4. The centrifugal pump according to claim 1, wherein the first clutch device comprises at least two clutch discs, wherein the at least two clutch discs are frictionally engaged with one another.

5. The centrifugal pump according to claim 4, wherein the at least two clutch discs engage at regions about the periphery of each of the at least two clutch discs, wherein the periphery of each of the at least two clutch discs is tapered.

6. The centrifugal pump according to claim 1, wherein the first clutch device comprises clutch parts, wherein the clutch parts are mechanically interengaged together.

7. The centrifugal pump according to claim 6, wherein the clutch parts comprise a series of projections that are mechanically interengaged together.

8. The centrifugal pump according to claim 1, further comprising a second hydraulically powered rotary actuator for incrementally adjusting the gap distance between the side liner and the impeller of the centrifugal pump in cooperation with the first hydraulically powered rotary actuator.

\* \* \* \* \*